United States Patent
Rieger et al.

(10) Patent No.: US 12,151,295 B2
(45) Date of Patent: Nov. 26, 2024

(54) WIRE DEFLECTOR AND WIRE SAW

(71) Applicant: Hilti Aktiengesellschaft, Schaan (LI)

(72) Inventors: Hans-Joerg Rieger, Thueringen (AT); David Plattner, Gallzein (AT)

(73) Assignee: Hilti Aktiengesellschaft, Schaan (LI)

( * ) Notice: Subject to any disclaimer, the term of this patent is extended or adjusted under 35 U.S.C. 154(b) by 251 days.

(21) Appl. No.: 17/762,241

(22) PCT Filed: Oct. 5, 2020

(86) PCT No.: PCT/EP2020/077792
§ 371 (c)(1),
(2) Date: Mar. 21, 2022

(87) PCT Pub. No.: WO2021/073913
PCT Pub. Date: Apr. 22, 2021

(65) Prior Publication Data
US 2022/0339722 A1    Oct. 27, 2022

(30) Foreign Application Priority Data
Oct. 16, 2019   (EP) .................................... 19203463

(51) Int. Cl.
*B23D 57/00*   (2006.01)
(52) U.S. Cl.
CPC ................ *B23D 57/0061* (2013.01)
(58) Field of Classification Search
CPC ........ B23D 57/0053; B23D 57/0061; B23D 57/00; B28D 1/08
USPC ......................................................... 83/820
See application file for complete search history.

(56) References Cited

U.S. PATENT DOCUMENTS 6,513,513 B1    2/2003   Steiner et al.

FOREIGN PATENT DOCUMENTS

| CA | 2336188 A1 * | 2/2000 | |
|---|---|---|---|
| DE | 29814495 U1 | 12/1999 | |
| EP | 3375343 A1 | 9/2018 | |
| WO | WO-9518692 A1 * | 7/1995 | ......... B23D 57/0053 |
| WO | WO 2008130305 A1 | 10/2008 | |

OTHER PUBLICATIONS

Translation, WO 9518692 (Year: 2024).*
International Search Report of PCT/EP2020/077792, dated Jan. 12, 2021.

* cited by examiner

*Primary Examiner* — Nhat Chieu Q Do
(74) *Attorney, Agent, or Firm* — Davidson Kappel LLC

(57) ABSTRACT

A pivotable wire deflector 19 for a saw wire 3 of a wire saw 1 has a deflection roller 32, a pivot joint 60 and a clamping and spreading mechanism. The defection roller 32 has a running groove 45 for guiding the saw wire 3 of the wire saw 1. The pivot joint 60 has a rotary bearing block with a cylindrical receptacle 65, and a tube 63 which is arranged so as to be rotatable in the cylindrical receptacle, wherein the deflection roller 57 is attached to the one of rotary bearing block 62 or tube 63. A clamp 70 is fastened to the rotary bearing block 62 and arranged so as to enclose the tube 63. A lever 68 can be moved manually between a first position and a second position.

12 Claims, 5 Drawing Sheets

WIRE DEFLECTOR AND WIRE SAW

This is a National Phase Application of International Patent Application PCT/EP2020/077792, filed on Oct. 5, 2020, published as WO 2021/073913 A1 claiming priority to European Patent Application EP 19203463.5, filed on Oct. 16, 2019, the disclosure of both of which has been incorporated by reference herein.

FIELD OF THE INVENTION

The present invention relates to a wire deflector and to a wire saw.

SUMMARY OF THE INVENTION

A pivotable wire deflector according to the invention for a saw wire of a wire saw has a deflection roller, a pivot joint and a clamping and spreading mechanism. The deflection roller has a running groove for guiding the saw wire of the wire saw. The pivot joint has a rotary bearing block with a cylindrical receptacle, and a tube which is arranged so as to be rotatable in the cylindrical receptacle, wherein the deflection roller is attached to the one of rotary bearing block or tube. A clamp is fastened to the rotary bearing block and arranged so as to enclose the tube. A lever can be moved manually between a first position and a second position.

The clamping and spreading mechanism reduces, in response to the lever, in the first position, an inner circumference of the clamp to a first circumferential length and increases, in the second position, the inner circumference of the clamp to a second circumferential length. The first circumferential length is smaller than the second circumferential length, and the clamp bears with the first circumferential length with a contact surface against the tube.

Fixing a wire deflector is typically, including in dusty environments, to be realized by means of different measures. However, the release of such a fixing as a rule requires a tool, since the fixing is gummed up by the ingress of dust and slurry. The wire deflector according to the invention provides for the clamp to be actively spread apart in the released, second position by increasing the circumference. The user can introduce the force for spreading apart by way of the lever. The lever exerts, in the first position, a pulling force for reducing the circumference of the clamp and, in the second position, a pushing force for increasing the circumference of the clamp.

One embodiment of the wire deflector provides that the clamp has an end which is movable with respect to the rotary bearing block. The clamping and spreading mechanism has a shaft which is oriented along a longitudinal axis of the tube and which has an eccentric cam; a rotary bearing for the shaft; and a camway enclosing the cam. Either the rotary bearing of the shaft is attached to the movable end of the clamp and the camway is attached to the rotary bearing block, or the camway is attached to the movable end and the rotary bearing of the shaft is attached to the rotary bearing block.

One embodiment of the wire deflector provides that the lever is coupled to the shaft, and the cam, in a first position of the lever, forces the camway into a first position, and the cam, in a the second position of the lever, forces the camway into a second position, wherein a distance as viewed in the circumferential direction around the tube between the camway and the rotary bearing of the shaft is different in the first position than in the second position.

The clamp of the pivotable wire deflector is preferably designed to be elastically deformable. The clamp can be cylindrical in form.

One embodiment of the pivotable wire deflector provides that the clamp is formed by one portion of the rotary bearing block, wherein the rotary bearing block has a gap in this portion, and this gap runs along a longitudinal axis of the tube. This portion can be delimited from an adjacent portion of the rotary bearing block by a slot which runs in the circumferential direction of the tube, wherein the slot runs around the tube through at least 90 degrees and a maximum of 270 degrees.

A longitudinal axis of the tube is preferably arranged tangentially to the running groove of the deflection roller. The wire deflector can be simply pivoted about the longitudinal axis without a height adaptation for the wire guidance being necessary. The tube is preferably hollow in order to guide the saw wire through this tube. An axis of the deflection roller can lie in a plane perpendicular to the longitudinal axis of the tube.

The wire deflector can have a stationary foot which is attached to the other of rotary bearing block or tube.

According to one aspect of the invention, a wire saw for an endless saw wire has a housing, a wire drive, and a wire store. The wire drive is for pulling the saw wire in a circulating direction. The wire store has a first package of deflection rollers and a second package of deflection rollers. The second package is mounted so as to be displaceable with respect to the first package along a direction in order to increase a length of the saw wire stored on the wire store. A feed device exerts a feed force on the second package in the direction. The cable store is arranged downstream of the wire drive in the circulating direction. The wire saw pulls the saw wire in the circulating direction, resulting in a tensile stress on the saw wire running into the wire saw. By contrast, the saw wire running out of the wire saw is largely without tension. The relative arrangement of wire drive and wire store allows tensioning of the running-out saw wire by the wire store.

One embodiment of the wire saw provides for the feed device to be pneumatically designed or to exert the feed force on the second package by way of a mechanical spring. The introduction of the feed force by pneumatic or spring means proves to be advantageous in order to protect the service life of the saw wire with respect to the wire tension that quickly and strongly varies on account of inhomogeneities of the structural element to be sawed.

One embodiment provides for the wire drive to have one or more motors. The motors are coupled to the one or more drive rollers for pulling the saw wire in a circulating direction. The wire drive is distinguished by the driven rollers, by contrast to the free-running rollers, for example of the wire store. The deflection rollers of the wire store are preferably free-running, that is to say neither driven nor braked.

Embodiments of the wire saw provide for a wire outlet provided on the housing to let out the saw wire. The wire store is arranged between the at least one drive roller and the wire outlet. The endless saw wire can be guided from the wire outlet directly to the wire drive; in particular, the saw wire can be guided rectilinearly from the wire store to the wire outlet. The wire store can exert a tensioning force on the running-out saw wire as far as possible without friction losses or similar losses.

Embodiments of the wire saw provide for a wire inlet provided on the housing for pulling the saw wire into the housing. The wire drive is arranged between the wire inlet and the wire store. The endless saw wire can be guided from the wire inlet directly to the wire drive; in particular, the endless saw wire can be guided from the wire inlet rectilinearly to the wire drive.

According to one aspect of the invention, a deflection roller for a deflection roller package of a wire saw has a wheel, a rotary bearing and a sealing element. The wheel has along its circumference a running groove for guiding a saw wire of the wire saw. The rotary bearing is inserted coaxially into the wheel. An outer sleeve projects from one lateral surface of the wheel. An inner sleeve projects from a lateral surface opposite to the one lateral surface. A radius of the inner sleeve is smaller than a radius of the outer sleeve. The sealing element is placed on the outer sleeve or inserted into the inner sleeve.

The deflection rollers are exposed to high loading. The individual deflection rollers have to adapt their rotational speed independently of one another to the running speed of the saw wire, otherwise they would be cut in a very short time. For the same reason, the rotary bearings have to be very smooth-running. Dust and water clog the rotary bearings. Good sealing is therefore absolutely necessary. The conceptually simplest sealing seals each rotary bearing individually. This ensures good sealing and at the same time complete independence of the deflection rollers. However, the sealing element in this case contacts both stationary and rotating elements, for example an axle and the deflection roller. The high rotational speed induces wear in the sealing element. The solution according to the invention accepts a weak coupling of adjacent deflection rollers by the sealing element. It is shown that the deflection rollers can continue to rotate at a sufficiently different rotational speed without being damaged by the saw wire. By contrast, the sealing element is exposed to virtually no loading, since the difference in the rotational speed of adjacent deflection rollers is small. The rotary bearings are protected by the continuous tube formed from the wheels and sealing elements.

A radial cord thickness of the sealing element is advantageously greater than a difference between the radius of the outer sleeve and the radius of the inner sleeve. The sealing element contacts the two adjacent deflection rollers in each case in the radial direction.

One embodiment provides for the rotary bearing to be arranged radially inside the inner sleeve. The outer sleeve can project axially with respect to the rotary bearing. The inner sleeve can project axially with respect to the rotary bearing.

One embodiment of the deflection roller provides for the running groove to have a plane of symmetry and for a center of gravity of the rotary bearing to be offset axially in relation to the plane of symmetry.

A deflection roller package has at least two adjacent deflection rollers (32) of the above-described deflection rollers. The inner sleeve of one of the deflection rollers engages axially in the outer sleeve of the adjacent deflection roller. The sealing element of the deflection roller bears radially against the outer sleeve and likewise bears radially against the engaging inner sleeve.

One embodiment of the deflection roller package is characterized in that the outer sleeve is spaced apart from the engaging inner sleeve.

The rotary bearings can be rolling bearings, in particular ball bearings or needle bearings, or rolling bearings without running bodies.

One embodiment of a wire saw with a wire drive has a wire store having at least one of the above-described deflection roller packages.

BRIEF DESCRIPTION OF THE FIGURES

The following description explains the invention with reference to exemplary embodiments and figures, in which.

DETAILED DESCRIPTION

Figure 1:
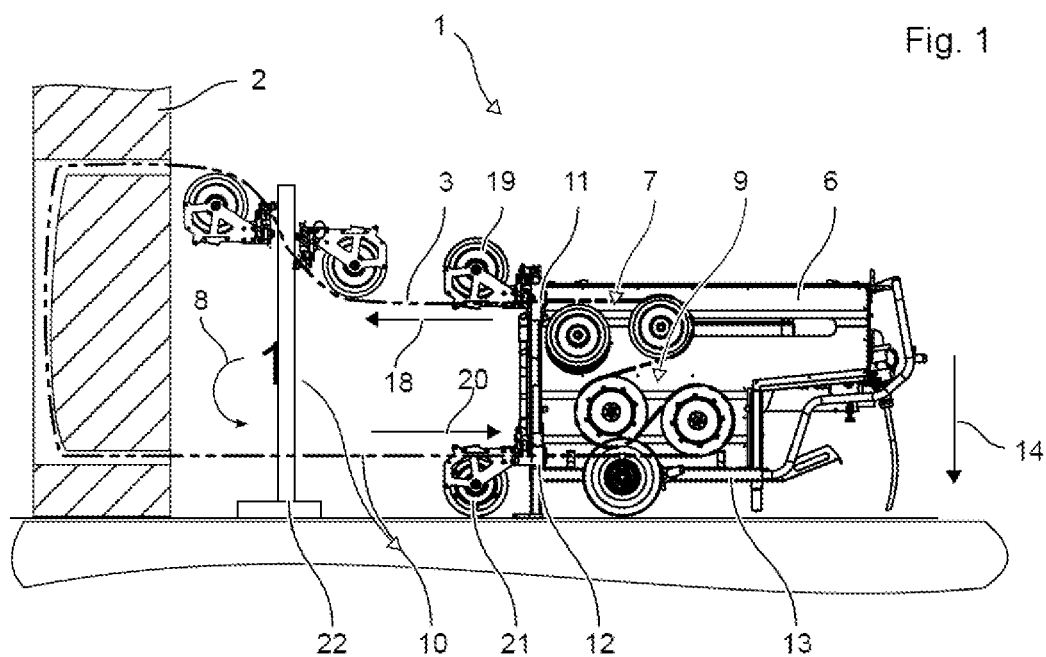
FIG. 1 shows a wire saw
Figure 2:
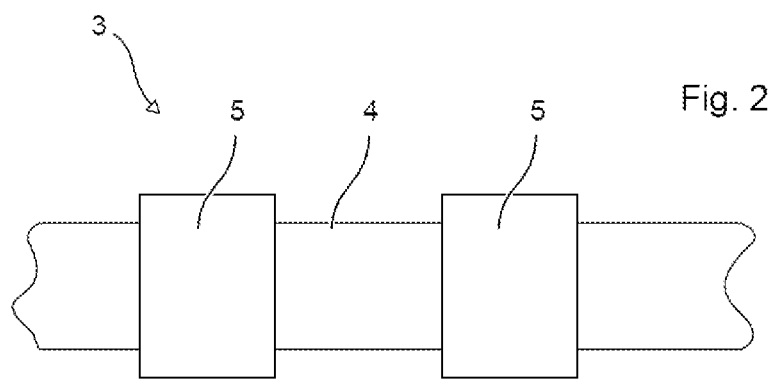
FIG. 2 shows a detail of a wire saw

FIG. 1 shows an exemplary construction of a wire saw 1 in a side view. The wire saw 1 is suitable for example for cutting walls, blocks, pillars, buildings and other large structures or structural elements 2 consisting of natural stone, concrete, bricks, or other mineral building materials. The building materials can also contain a reinforcement made of steel. The wire saw 1 allows different cutting patterns; for example, cutting surfaces can be planar, cylindrical, conical or prismatic.

The wire saw 1 cuts the workpieces 2 by means of an endless saw wire 3 in the form of a loop. The saw wire 3 has a carrier wire 4 whose ends are connected to one another to form a loop. The carrier wire 4 is flexible. The carrier wire 4 can be based for example on a wire cable. Arranged along the carrier wire 4 on its circumference are a plurality of cutting bodies 5 for mineral building materials. The cutting bodies 5 are for example made of sintered hard metal and/or provided with diamonds. The hard cutting bodies 5 can grind or cut the mineral building materials and the possibly present reinforcing bars.

The wire saw 1 is positioned away from the structural element 2. The saw wire 3 in the form of a loop is placed around the structural element 2 to be severed and guided through a housing 6 of the wire saw 1. A wire store 7 in the housing 6 allows the length of the saw wire 3 outside the wire saw 1 to be adapted to the structural element 2 and to the distance between the wire saw 1 and structural element 2. The wire saw 1 drives the saw wire 3 in a circulating manner. A circulating direction 8 of the saw wire 3, inside and outside the wire saw 1, is prescribed by a wire drive 9 in the housing 6 of the wire saw 1. The wire drive 9 produces a tensile stress on the returning portion 10 of the saw wire 3, that is to say the portion proceeding from the structural element 2 toward the wire saw 1. The tensile stress results in a pressing force of the saw wire 3 onto the structural element 2 that is essential for the cutting of the structural element 2 by the moving cutting bodies 5.

The housing 6 of the wire saw 1 has a wire outlet 11 and a wire inlet 12. The saw wire 3 can be led out of the housing 6 through the wire outlet 11; analogously, the saw wire 3 can be led into the housing 6 through the wire inlet 12. The wire outlet 11 and the wire inlet 12 are preferably arranged on one side of the housing 6. The wire inlet 12 is preferably configured to be close to an underside 13 of the housing 6. With a proper setup of the wire saw 1, that is to say with the underside 13 pointing in the vertical direction 14 toward the ground, the wire inlet 12 is close to the ground. The advantage in this arrangement consists in better protection for the user should tearing occur to the returning portion 10, which is under tension, of the saw wire 3. The loose end of the torn saw wire 3 moves close to the ground and can be stopped by the housing 6. The wire outlet 11 is preferably vertically spaced apart from the wire inlet 12, that is to say is at a greater distance from the underside 13 than the wire inlet 12.

Figure 3:
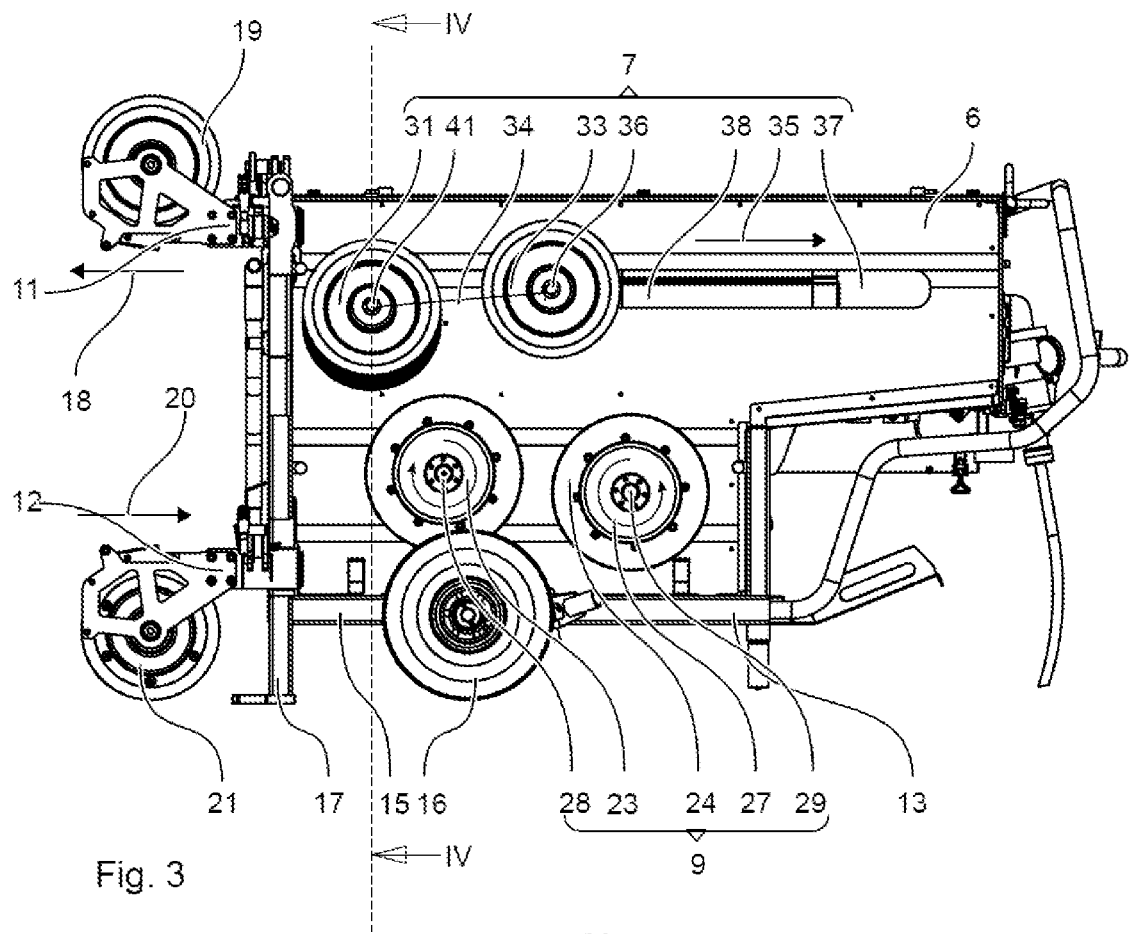
FIG. 3 shows the wire saw

As shown in FIG. 3 for example, housing 6 can have a chassis 15 on the underside 13. The chassis 15 has a plurality of wheels 16, for example. The wheels 16 can be removable or blockable. The housing 6 can have on the underside 13, in addition to or instead of the chassis 15, one or more feet 17 which are height-adjustable or can be pivoted out. The housing 6 can be closed or configured as a frame. The wire drive 9 and the wire store 7 in the housing 6 are preferably accessible from one side such that the saw wire 3 can be inserted and wound around the rollers of the wire drive 9 and of the wire store 7.

The saw wire 3 exits the housing 6 in an (outlet) direction 18 prescribed by the wire outlet 11. The outlet direction 18 is for example perpendicular to the one side of the housing 6; for example, the outlet direction 18 is parallel to the horizontal plane, that is to say the standing surface of the wire saw 1 or underside 13 of the housing 6. A pivotable wire deflector 19 is advantageously provided on the housing 6 adjacent to the wire outlet 11. The wire deflector 19 allows the saw wire 3 to be deflected in any other direction in a constraint-free manner. Analogously, the saw wire 3 enters the housing 6 in an (inlet) direction 20 prescribed by the wire inlet 12. The inlet direction 20 is preferably antiparallel to the outlet direction 18. A wire deflector 21 on the wire inlet 12 allows the saw wire 3 to be introduced from any desired direction into the housing 6 in a constraint-free manner. External deflection devices 22 arranged outside the wire saw 1 can be used to guide the saw wire 3 around obstacles or according to desired cutting lines. The deflection devices 22 can be moved, for example to cut prismatic or cylindrical shapes out of a wall.

The wire saw 1 has the wire drive 9 inside the housing 6. The wire drive 9 includes one or more motor-driven drive rollers 23, 24. The drive rollers 23, 24 are coupled to one or more motors 25 directly or indirectly via a gear mechanism. The drive rollers 23, 24 are driven by the motors 25, 26 in a direction of rotation 27 about their axes of rotation 28, 29. The direction of rotation corresponds to the circulating direction 8 of the saw wire 3. The saw wire 3 can be wrapped around the drive rollers 23. The drive rollers 23 pull the saw wire 3 in the circulating direction 8 prescribed by the drive rollers 23. The wire drive 9 ensures a pulling force on the saw wire 3. In order for this pulling force to be transmitted preferably unimpeded to the part running outside the housing 6, the wire drive 9 is preferably arranged directly downstream of the wire inlet 12. Wire guidance of the saw wire 3 between the wire inlet 12 and the wire drive 9 is invariable.

In the illustrated embodiment, the saw wire 3 is guided rectilinearly along the inlet direction 20 from the wire inlet 12 to the wire drive 9. No deflection rollers or other elements influencing the saw wire 3 are arranged between the wire inlet 12 and the wire drive 9. In other embodiments, one or more deflection rollers can be arranged between the wire inlet 12 and the wire drive 9. The deflection rollers are freely rotating, that is to say neither driven nor braked. Furthermore, the axles of the deflection rollers are stationary. The length of the guide path between the wire inlet 12 and the wire drive 9 is invariably constant.

The illustrated wire drive 9 has a first drive roller 23 and a second drive roller 24 which are arranged offset in relation to one another. The axes 28, 29 of the two drive rollers 23, 24 are preferably parallel to one another. The two drive rollers 23, 24 can have an equal-sized circumference and be driven at the same rotational speed. The design of the wire saw 1 is very compact in order to allow good transportation of the wire saw 1. The saw wire 3 is guided from the first drive roller 23 directly to the second drive roller 24. For that reason, the directions of rotation of the two drive rollers 23 are designed to be opposite. The two drive rollers 23 can be driven by the same motor 25. Preferably, however, the first drive roller 23 is driven by a first motor 25, and the second drive roller 24 is driven by a second motor 26. The motors 25, 26 are synchronized by a motor controller 30. The motor controller 30 can control a torque output of the two motors 25, 26 in such a way that the output torque is equal over both drive rollers 23, 24. The saw wire 3 is moved without slip by the drive rollers 23. The rotational speed or the torque is reduced if the circulating speed of the saw wire 3 is lower than the speed of revolution of the drive rollers 23, since otherwise the saw wire 3 would cut the drive rollers 23.

The motors 25 are preferably gas- or gasoline-driven internal combustion engines; alternatively, electric, hydraulic or pneumatic motors can also drive the drive rollers 23, 24.

The wire saw 1 has an adaptable wire store 7. The wire store 7 is arranged inside the housing 6. The saw wire 3 is guided via the wire store 7. The wire store 7 makes it possible to set the guide path, and in particular its length, inside the housing 6. As a result, the wire length of the loop 10 outside the housing 6 can be adapted. The wire length of the loop 10 is adapted both before the start of sawing in dependence on the setup of the wire saw 1 and the structural element 2. Furthermore, the wire length of the loop 10 is also adapted to the progression of the sawing. The required wire length of the loop 10 becomes typically shorter with increasing cutting depth. The wire store 7 compensates for the variation in the outer loop 10.

The wire store 7 is based substantially on a first package 31 of deflection rollers 32 and a second package 33 of deflection rollers 32. The saw wire 3 is, analogously to a block and tackle, guided in alternating fashion around a deflection roller 32 of the first package 31 and a deflection roller 32 of the second package 33. The wire length of the saw wire 3 wound up or "stored" in the wire store 7 is dependent, inter alia, on the distance 34 between the two packages 31, 33. The distance 34 is settable. For this purpose, at least one of the packages 31 is displaceable in the housing 6 with respect to the other package 33 in a direction 35. An axle 36 of the displaceable package 33 can be guided, for example in a slotted guide 37, parallel to the horizontal plane.

The wire store 7 has a feed device 38 which exerts a feed force on the displaceable package 33 in the distance 34 increasing direction 35. The direction 35 is perpendicular to the axis of rotation 36 of the displaceable package 33. The user can set the feed force of the feed device 38. The displaceable package 33 is displaced until an equilibrium of the pulling forces in the saw wire 3 wound up on the wire store 7 and of the force spreading apart the wire store 7 has been set by the feed device 38. The wire store 7 thus automatically shortens the length of the saw wire 3 running outside the wire saw 1 in correspondence with the progression of sawing. The packages 31, 33 are pushed apart until the saw wire 3 bears tautly against the structural element 2.

The pulling force of the drive rollers 23 is counteracted by the frictional forces of the saw wire 3 along the cut in the structural element. The tension and thus the pressing-on force is reduced counter to the circulating direction 8 of the saw wire 3. The saw wire 3 between the wire outlet 12 and the structural element is therefore only slightly tensioned. The wire store 7 and its feed device 38 contribute to the tension of this portion. The tension increased by means of the wire store 7 increases the detaching power since the outgoing saw wire 3 is already pressed onto the structural element 2. The wire store 7 is preferably arranged in the circulating direction 8 directly upstream of the wire outlet 12. In particular, no driven or braked deflection rollers are arranged between the wire store 7 and the wire outlet 12 that influence the tensile stress exerted by the wire store 7 counter to the circulating direction 8. The saw wire 3 is preferably guided rectilinearly from the moved package 33 to the wire outlet 12.

The tension in the saw wire 3 is dependent on the friction and thus on the building material. Since the building material is typically inhomogeneous in a structural element 2, there result fluctuations in the frictional forces and, resulting therefrom, fluctuations in the wire tension. The feed device 38 can quickly dampen this fluctuation and thus avoid overloading of the saw wire 3. A continuous adaptation of the circulating speed of the saw wire 3 or of the pressure by the user is not necessary.

Figure 4:
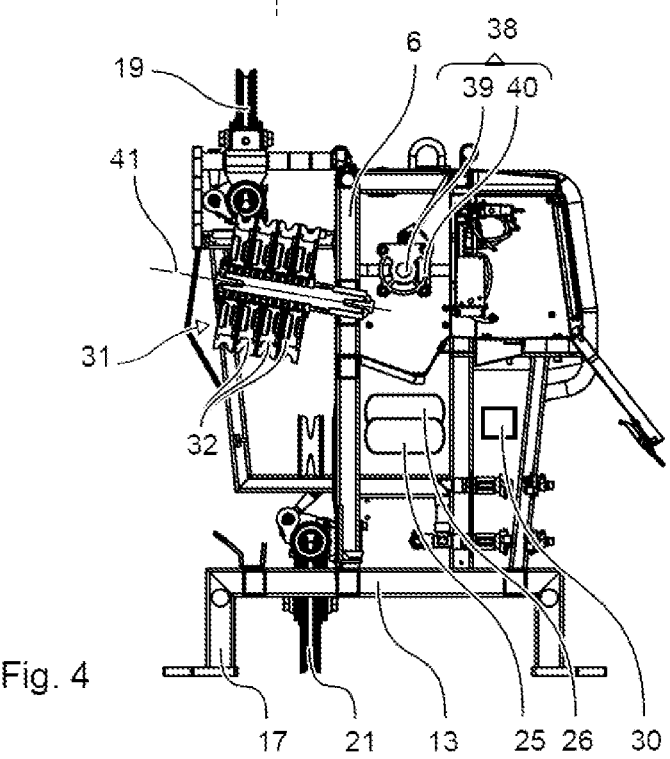
FIG. 4 shows a section in plane IV-IV of the wire saw

The feed device 38 preferably includes ai-Fi resilient element. For example, the feed device 38 is a pneumatic feed device 38. The pneumatic feed device 38 includes a pneumatic cylinder 39 and a reciprocating piston 40 guided in the pneumatic cylinder, (see, e.g., FIG. 4). The pneumatic cylinder is fastened to the housing 6. The reciprocating piston 40 is coupled to the package 33. For example, the reciprocating piston acts on a rotary bearing of the package 33. The feed force is set by the pressure in the pneumatic feed device 38. Instead of a pneumatic feed device, the feed device can include a mechanical spring and a mechanical actuating drive, for example having a motor-driven spindle.

The exemplary embodiment illustrated has a stationary first package 31 and a second package 33 which is movable to the slotted guide 37. The first package 31 has an axle 41 which is anchored in the housing 6 and on which the deflection rollers 32 are placed (see, e.g., FIG. 5). The axle 41 is for example perpendicular to the vertical plane. The deflection rollers 32 are mounted in a freely rotating manner on the axle 41. For example, the deflection rollers 32 each contain a rolling bearing 42 in order to ensure as friction-free a rotation as possible of the deflection rollers 32 (see, e.g., FIG. 6). The deflection rollers 32 can rotate independently of one another. In particular, the rotational speed of adjacent deflection rollers 32 can differ, for example on account of diameters which differ as a result of inhomogeneous wear. During the winding-up of loose saw wire 3, different rotational speeds of inner and outer deflection rollers 32 can also occur. The package 31 can in principle have any desired number of deflection rollers 32. Limited by the housing 6 and the necessary adaptation of the outer part of the saw wire 3 during sawing, the package 31 typically has from four to eight deflection rollers 32. The second package 33 likewise has an axle 36 on which the deflection rollers 32 are mounted in a friction-free manner. A number of the deflection rollers 32 of the second package 33 is identical to the number of the deflection rollers 32 of the first package 31. The axle 36 can be arranged parallel to the first axle 41. The two axles 41, 36 are preferably inclined with respect to one another in order to be able to wind the saw wire 3 in a constraint-free manner in alternating fashion around the deflection rollers 32 of the first package 31 and the deflection rollers 32 of the second package 33. The relative inclination is low, typically in the range between 5 degrees and 20 degrees. The saw wire 3 is preferably guided directly from one of the drive rollers 23 rectilinearly to a deflection roller 32 of the first package 31. The saw wire 3 leaves the wire store 7 from one of the deflection rollers 32 of the second package 33 rectilinearly to the wire outlet 12. The first package 31 is, as compared with the second package 33, arranged closer to the wire outlet 12.

Figure 5:
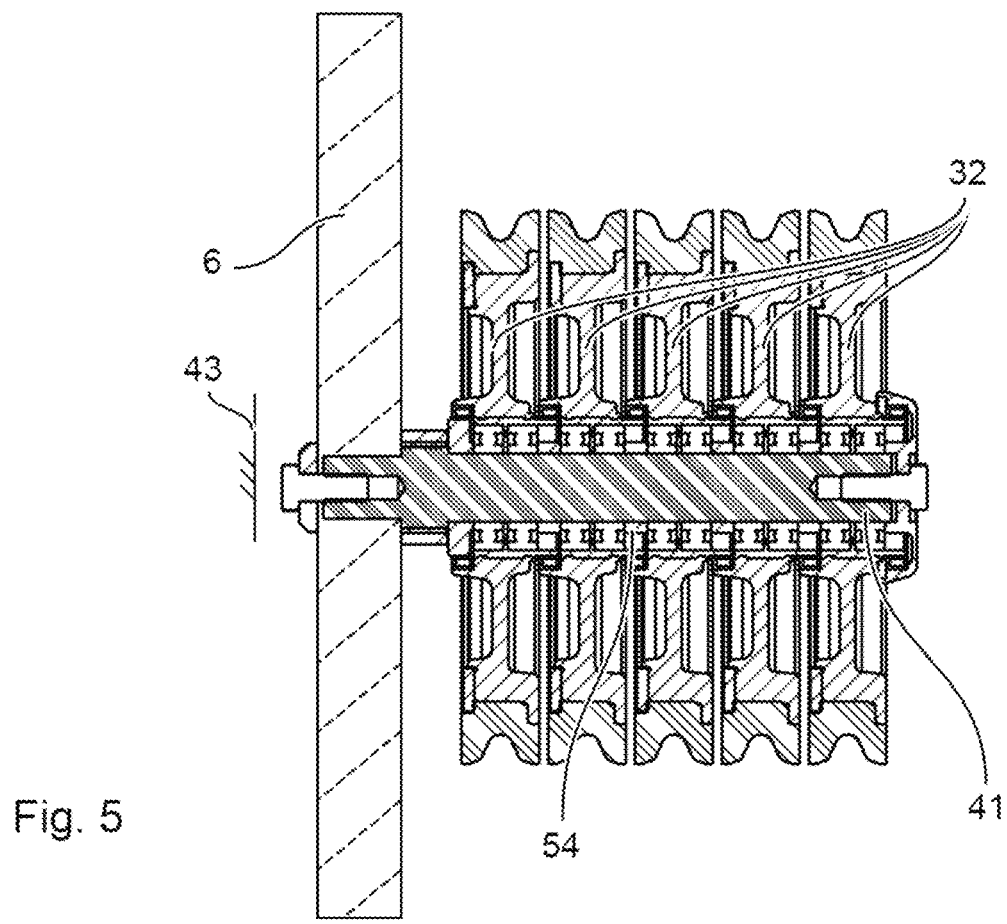
FIG. 5 shows a package of deflection rollers for a wire store
Figure 6:
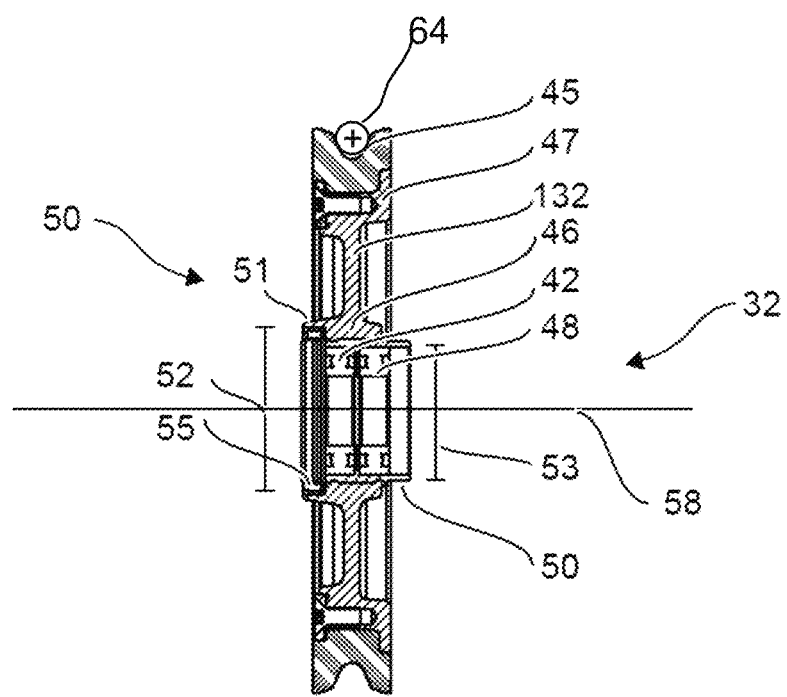
FIG. 6 shows an individual deflection roller of the package

An exemplary construction of one of the packages 31 of the wire store 7 is illustrated in FIG. 5, and an individual deflection roller 32 for the package 31 is illustrated in FIG. 6. The exemplary package 31 has five deflection rollers 32 which are arranged on the axle 41. The axle 41 can be rigidly fastened in the housing 6 or be mounted so as to be rotatable in the housing 6. An orientation of the axle 41 is perpendicular to the vertical plane or tilted by a few degrees with respect to the perpendicular to the vertical plane. The vertical plane 43 is defined by the vertical direction 44 and the horizontal longitudinal direction 18.

The deflection rollers 32 are preferably of identical configuration. The deflection rollers 32 can be individually exchanged if their running groove 45 is worn. The deflection rollers 32 are based on a wheel 132. The exemplary wheel 132 has a central hub 46, a rim 47 and a disk-shaped support which connects the rim 47 to the hub 46. In other embodiments, the wheel 132 can have spokes or the like instead of a solid support. The wheel 132 can be manufactured from steel, aluminum or another loadable material. The deflection roller 32 has a running groove 45. The running groove 45 runs along the entire circumference of the wheel 132. The saw wire 3 is guided to the running groove 45. The running groove 45 can be formed for example by a ring made of polymer. The running groove 45 is fitted onto the rim 47 of the wheel 132. Each of the deflection rollers 32 is mounted on the axle 41 in a freely rotating manner. For this purpose, rolling bearings 42 are inserted into the hub 46 of the wheel 132. An inner ring 48 of the rolling bearing 42 is seated on the axle 41. The rolling bearings 42 are ball bearings or needle bearings, for example. In the exemplary embodiment, two ball bearings arranged with an axial offset form the rolling bearing 42. The double arrangement allows a compact design and a high degree of stiffness against the wheel 132 tilting with respect to the axle 41. The saw wire 3 coming from the other package 33 is fed to the running groove 45 slightly obliquely. This produces a resulting force along the axle 41. For this, the rolling bearings 42 can be arranged offset along the axle 41 asymmetrically to the running groove 45. The plane of symmetry of the running groove 45 that is perpendicular to the axle 41 and the plane of symmetry of the rolling bearing 42 that is likewise perpendicular to the axle 41 are offset in relation to one another.

The rolling bearing 42 must be sealed with respect to dust, slurry, water, etc. This is of especial importance particularly in the rough working environment of the wire saw 1 and the dust, slurry, water, etc., transported along by the saw wire 3. A loss of the free running of the deflection wheel inevitably increases the wear, with in particular the saw wire 3 cutting a blocked deflection roller 32 in a very short time. The deflection roller 32 seals, in each case with the adjacent deflection roller, its rolling bearing 42. The deflection roller 32 has an axially projecting, inner sleeve 50 on one lateral surface 49 and an axially projecting, outer sleeve 51 on the other lateral surface 50. The two hollow-cylindrical sleeves 51, 50 are arranged coaxially to the hub 46. An outer radius 52 of the inner sleeve 50 is smaller than an inner radius 53 of the outer sleeve 51. The inner sleeve 50 engages in the outer sleeve 51 of the adjacent deflection roller 32. The inner sleeve 50 and the outer sleeve 51 of the adjacent deflection roller 32 are spaced apart from one another. The axial spacing can be set for example by means of a spacer disk 54 between the deflection rollers 32.

A sealing ring 55 is inserted into the outer sleeve 51. The sealing ring 55 has a Ge-Fd radial thickness 56 which is somewhat greater than the difference between the two radii 52, 53. The sealing ring 55 seals with the outer sleeve 51 and the inner sleeve 50 of the adjacent deflection roller 32. The sealing ring 55 preferably contacts the two sleeves only in the radial direction 14 and is spaced apart at least from one of the sleeves in the axial direction. Sealing by means of the radially enclosed sealing ring 55 proved to be more reliable than sealing by means of an axially enclosed sealing ring. By virtue of the contacting sealing ring 55, there results a weak entrainment of adjacent deflection rollers 32 at different rotational speeds. Since typically the deflection rollers 32 have approximately the same rotational speed, the wear of the sealing ring 42 resulting from the entrainment is tolerable.

Figure 7:
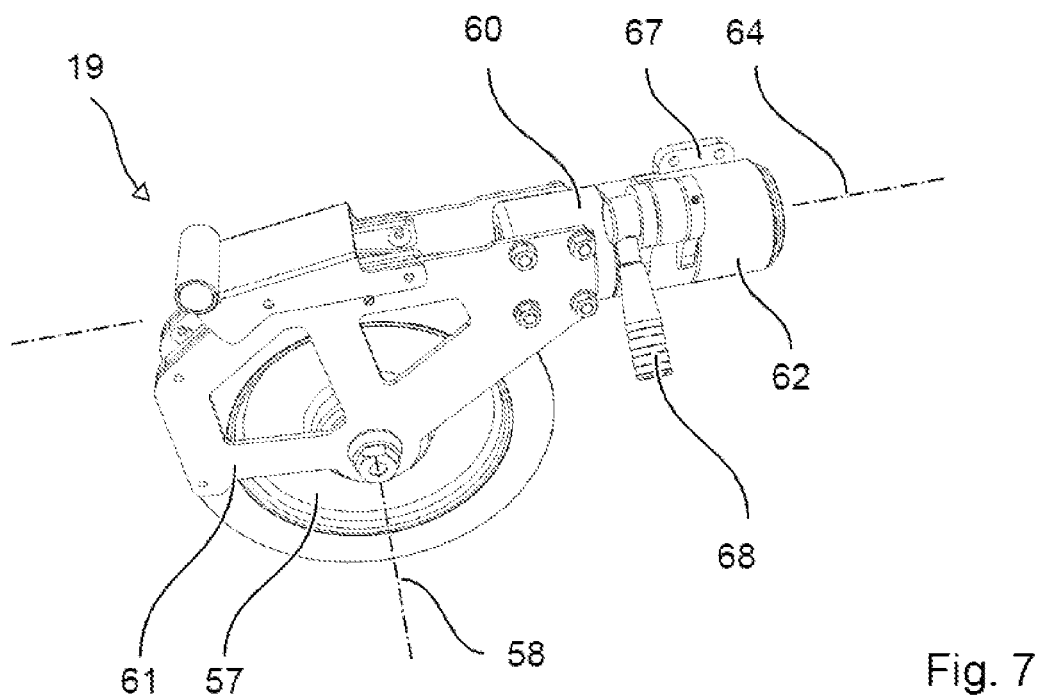
FIG. 7 shows a pivotable deflection roller
Figure 8:
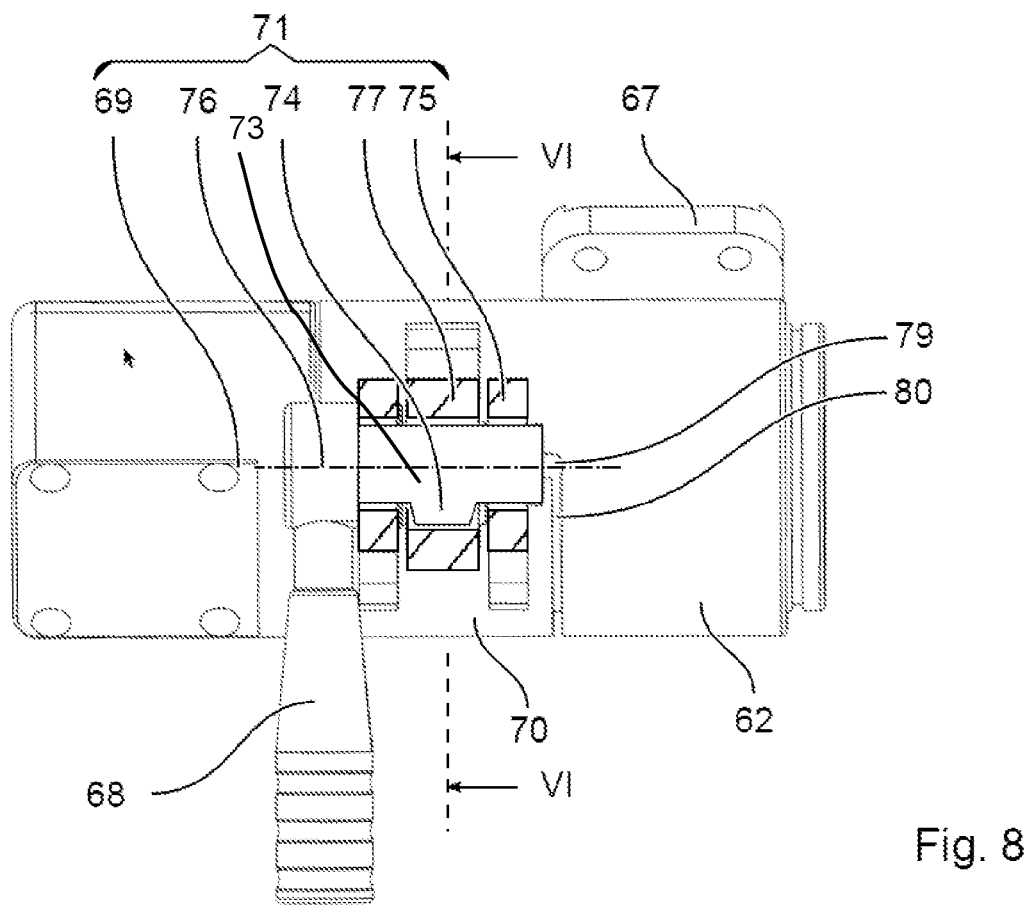
FIG. 8 shows a pivot joint of the pivotable deflection roller

FIG. 7 and FIG. 8 show the pivotable wire deflector 19 in greater detail. The wire deflector 19 has a deflection roller 57 via which the saw wire 3 can be guided. The saw wire 3 is guided by the deflection roller 57 in a guide plane. The pivotable wire deflector 19 has a pivot joint 60 which makes it possible to set the spatial position of the guide plane of the deflection roller 57. The plane can be oriented by any desired angle to the outlet direction 18 or the inlet direction 20. The user can thus deflect the saw wire 3 upwardly, downwardly, to the right, to the left or one of the directions situated in between. The wire deflector can also be used for the external deflection device 22.

The deflection roller 57 can be designed substantially analogously to the above-described deflection rollers 32. The deflection roller 57 has a wheel 132 with an encircling running groove 45 (see, e.g., FIG. 5). The saw wire 3 is guided in the running groove 45. The wheel 132 is mounted so as to be rotatable about an axis 58. The axis 58 and the running groove 45 are perpendicular to one another. The running groove 45 and the axis 58 define the guide plane. The wheel 132 is mounted in a cage 61, for example.

The pivot joint 60 connects the deflection roller 32 to the housing 6. The pivot joint 60 has a rotary bearing block 62 and a tube 63 mounted in the rotary bearing block 62 (see, e.g., FIG. 9). The tube 63 has a longitudinal axis 64 which coincides for example with the inlet direction 20 or the outlet direction 18 of the wire saw 1. The tube 63 is rotatable about its longitudinal axis 64 in the rotary bearing block 62. The rotary bearing block 62 has a corresponding cylindrical receptacle 65. One diameter of the receptacle 65 has a diameter which, apart from a necessary clearance for the rotary bearing arrangement, corresponds to the outside diameter of the tube 66. In the illustrated embodiment, the rotary bearing block 62 has a foot 67 via which the rotary bearing block 62 is fastened to the housing 6 of the wire saw 1. The deflection roller 57 is attached to the tube 63; for example, the cage 61 is fastened to the tube 63. In another embodiment, the tube 63 can be attached to the foot 67, and the rotary bearing block 62 can be attached to the deflection roller 57.

The user can fix the pivot joint 60. For this purpose, there is provided a lever 68 which can be brought into two different positions. The exemplary lever 68 is pivotable about an axis 69. In the exemplary embodiment, the lever 68 can be pivoted over 180 degrees. In a first position, for example zero degrees, the tube 63 is fixed in the rotary bearing block 62. In a second position, for example 90 degrees, the tube 63 is rotatable. A third position, for example 180 degrees, serves for releasing the tube 66 if the pivot joint 60 is soiled. The fixing of the tube 66 is effected by way of a clamp 70. The clamp 70 encloses the tube 63. The clamp 70 is fastened to the rotary bearing block 62.

Figure 9:
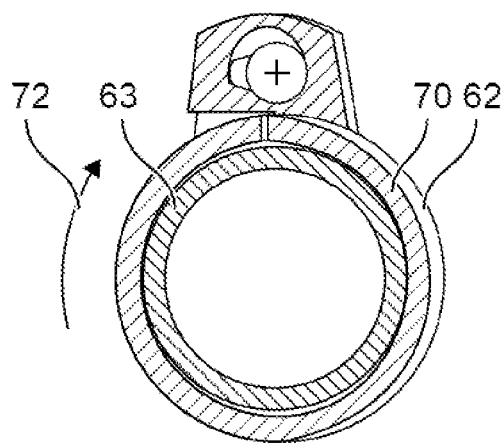
FIG. 9 shows a section through a clamping and spreading mechanism in a fixed position
Figure 10:
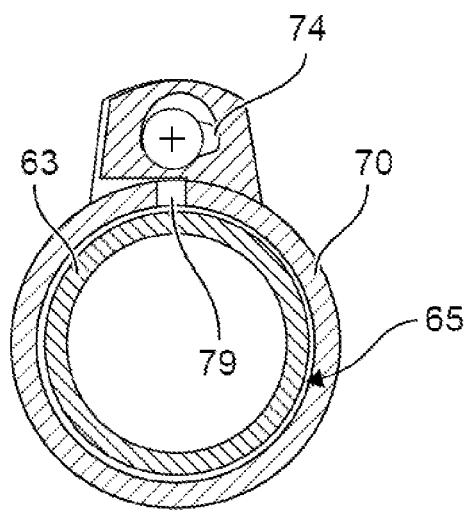
FIG. 10 shows a section through the clamping and spreading mechanism in a spread-apart position Identical or functionally identical elements are indicated by the same reference signs in the figures, unless stated otherwise.

A clamping and spreading mechanism 71 shortens the circumference or spreads the circumference of the clamp 70. The clamping and spreading mechanism 71 can shorten the inner circumference of the clamp 70 to such an extent that the clamp 70 bears with a contact surface against the tube 63. Upon fixing, the circumference of the clamp 70 is approximately identical to the outer circumference of the tube 66. The clamping and spreading mechanism can additionally brace the clamp 70 in order to reinforce the fixing by way of surface pressure of the clamp 70 on the tube 63. The tube 63 is fixed. The fixing position of the clamping and spreading mechanism is for example coupled to the first position of the lever 68 (FIG. 9). The clamping and spreading mechanism 71 can cancel the fixing by virtue of the clamping and spreading mechanism 71 spreading apart the clamp 70 to a circumference at which the clamp 70 bears only loosely or no longer against the tube 63. In this fixing-cancelling position, a circumferential length of the clamp 70 is greater than the circumferential length of the clamp 70 in the fixing position. The cancelling position is coupled to the second position of the lever 68. The clamping and spreading mechanism 71 advantageously has yet a third position in which the inner circumference can be additionally increased (FIG. 10). Typically, the inner tube 63 gums up in the clamp 70 as a result of slurry and dirt. The additional spreading-apart assists the release of the tube 66 from the clamp 70. The clamping and spreading mechanism 71 preferably exerts a force acting in the circumferential direction 72 on the clamp 70 not only upon reducing the circumference of the clamp 70 but also exerts a force acting in the circumferential direction 72 on the clamp 70 upon increasing the circumference of the clamp 70. Under the typically prevailing rough and dirty conditions, a simple spring action of the clamp 70 is not sufficient to securely release the clamp 70.

The exemplary clamping and spreading mechanism 71 is based on a camshaft, that is to say a shaft 73 on which an eccentrically arranged cam 74 is arranged. The shaft 73 is mounted in a rotary bearing 75 so as to be rotatable about a shaft axis 76. The lever 68 is for example rigidly connected to the shaft 73 and makes it possible for the user to rotate the shaft 73. The shaft axis 76 is preferably parallel or approximately parallel to the longitudinal axis 64 of the tube 66. The cam 74 engages in a camway 77.

A rotation of the shaft 73 leads to a relative displacement of the camway 77 with respect to the rotary bearing 75. In the illustrated embodiment, the rotary bearing is arranged on the rotary bearing block 62, and the camway 77 is arranged on a portion of the clamp 70 that is movable with respect to the rotary bearing block 62. The relative movement of the rotary bearing 75 of the shaft 73 with respect to the camway 77 is translated into a movement of the movable end of the clamp 70 with respect to the rotary bearing block 62 in the circumferential direction 72 and thus into a shortening or enlarging of the circumference of the clamp 70 and its circumferential length.

The camway 77 can be formed for example by a surface pointing in the circumferential direction 72 (see, e.g., FIG. 9) and a surface pointing counter to the circumferential direction 72. The cam 74 bears against one of the surfaces in the shortening position and against the other of the surfaces in the spreading position. A radial distance 34 between the surfaces and the shaft axis 76 is smaller than the radial distance 34 between the cam 74 and the shaft axis 76; that is to say of the contact surface, which contacts the surfaces, of the cam 74.

The exemplary clamp 70 is designed as one portion of the rotary bearing block 62. The exemplary rotary bearing block 62 is likewise tubular. The clamp 70 is formed by a gap 79 running along the longitudinal axis 64. The clamping and spreading mechanism 71 closes or widens the gap 79 in the circumferential direction 72. The clamp 70 advantageously separates a slot 80 running in the circumferential direction 72 from the other portion of the rotary bearing block 62. As a result, the forces for closing or widening of the gap 79 are reduced. The slot 80 can run for example through more than 90 degrees in the circumferential direction 72, for example through less than 270 degrees in the circumferential direction 72.

What is claimed is:

1. A pivotable wire deflector for a saw wire of a wire saw, the pivotable wire deflector comprising:
   a deflection roller having a running groove for guiding the saw wire of the wire saw;
   a pivot joint having a rotary bearing block with a cylindrical receptacle and a tube arranged so as to be rotatable in the cylindrical receptacle, wherein the deflection roller is attached to the rotary bearing block or the tube;
   a clamp fastened to the rotary bearing block and enclosing the tube;
   a lever movable manually between a first position and a second position; and
   a clamping and spreading mechanism, the clamping and spreading mechanism in response to the lever, in the first position, reduces an inner circumference of the clamp to a first circumferential length and, in the second position, increases the inner circumference of the clamp to a second circumferential length, wherein the first circumferential length is smaller than the second circumferential length, and the clamp bears with the first circumferential length against the tube with a contact surface;
   the clamping and spreading mechanism having a shaft oriented along a longitudinal axis of the tube and having an eccentric cam, a rotary bearing for the shaft, and a camway enclosing the cam, wherein either the rotary bearing of the shaft is attached to the movable end of the clamp and the camway is attached to the rotary bearing block, or the camway is attached to the movable end and the rotary bearing of the shaft is attached to the rotary bearing block.

2. The pivotable wire deflector as recited in claim 1 wherein the clamp has an end movable with respect to the rotary bearing block.

3. The pivotable wire deflector as recited in claim 2 wherein the lever is coupled to the shaft, and the cam, in a the first position of the lever, forces the camway into a first position, and the cam, in a the second position of the lever, forces the camway into a second position, wherein a distance as viewed in the circumferential direction around the tube between the camway and the rotary bearing of the shaft is different in the first position than in the second position.

4. The pivotable wire deflector as recited in claim 1 wherein the clamp is designed to be elastically deformable.

5. The pivotable wire deflector as recited in claim 1 wherein the clamp is formed by one portion of the rotary bearing block, wherein the rotary bearing block has a gap in the one portion, and the gap runs along a longitudinal axis of the tube.

6. The pivotable wire deflector as recited in claim 5 wherein the one portion is delimited from an adjacent portion of the rotary bearing block by a slot running in a circumferential direction of the tube, wherein the slot runs at least 90 degrees and a maximum of 270 degrees around a circumference of the tube.

7. The pivotable wire deflector as recited in claim 1 wherein the clamp is cylindrical in form.

8. The pivotable wire deflector as recited in claim 1 wherein a longitudinal axis of the tube is arranged tangentially to a running groove of the deflection roller.

9. The pivotable wire deflector as recited in claim 1 wherein the tube is hollow.

10. The pivotable wire deflector as recited in claim 1 wherein an axis of the deflection roller lies in a plane perpendicular to the longitudinal axis of the tube.

11. The pivotable wire deflector as recited in claim 1 further comprising a foot attached to the other of rotary bearing block or tube.

12. A wire saw comprising a wire drive and the pivotable wire deflector as recited in claim 1.

* * * * *